Patented Aug. 28, 1928.

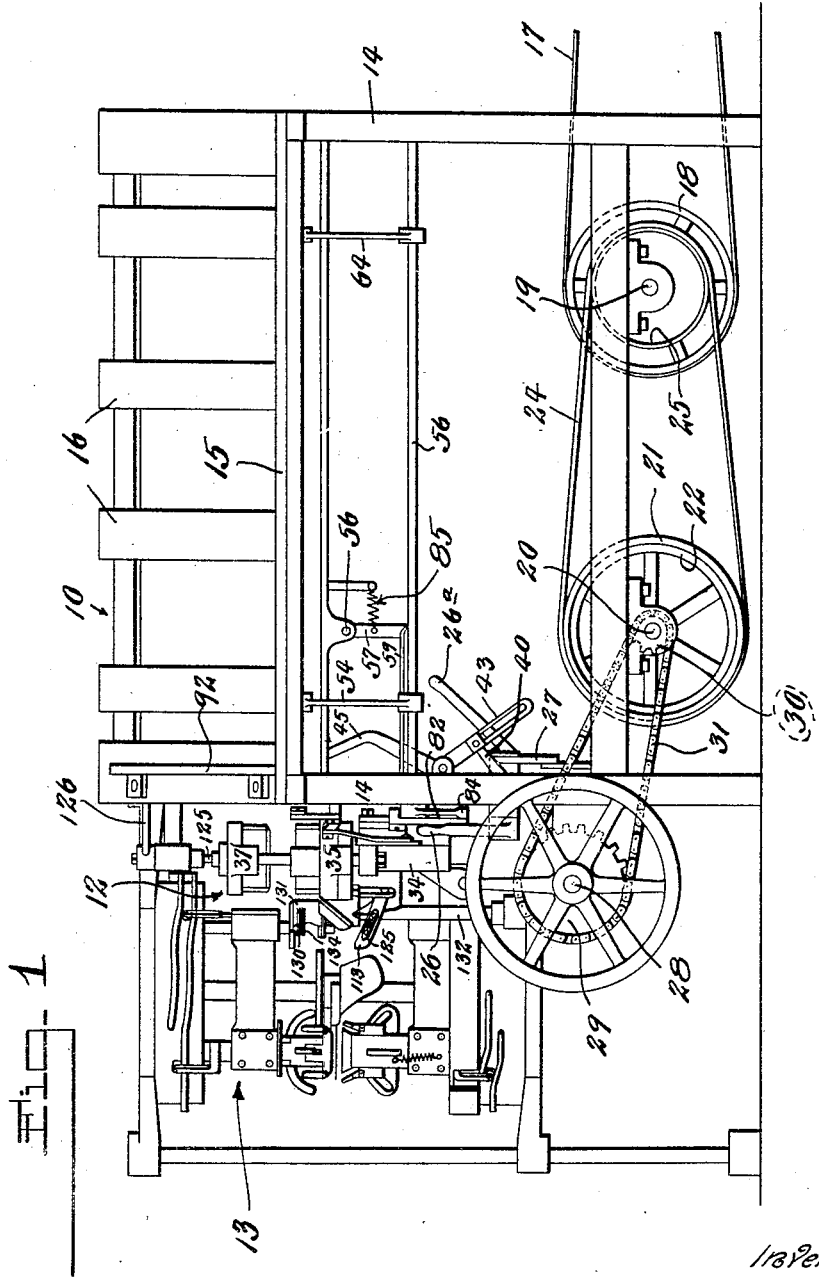

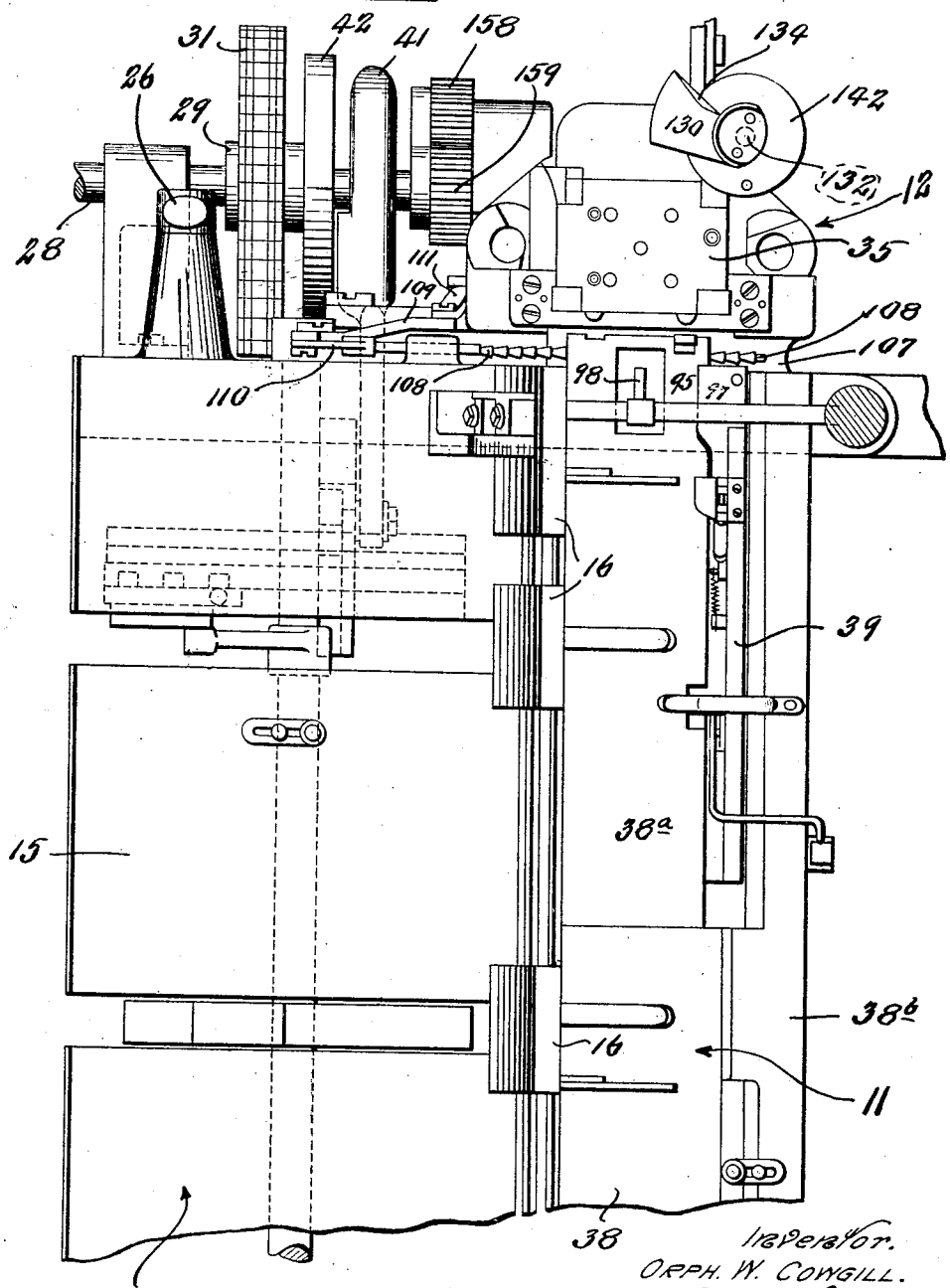

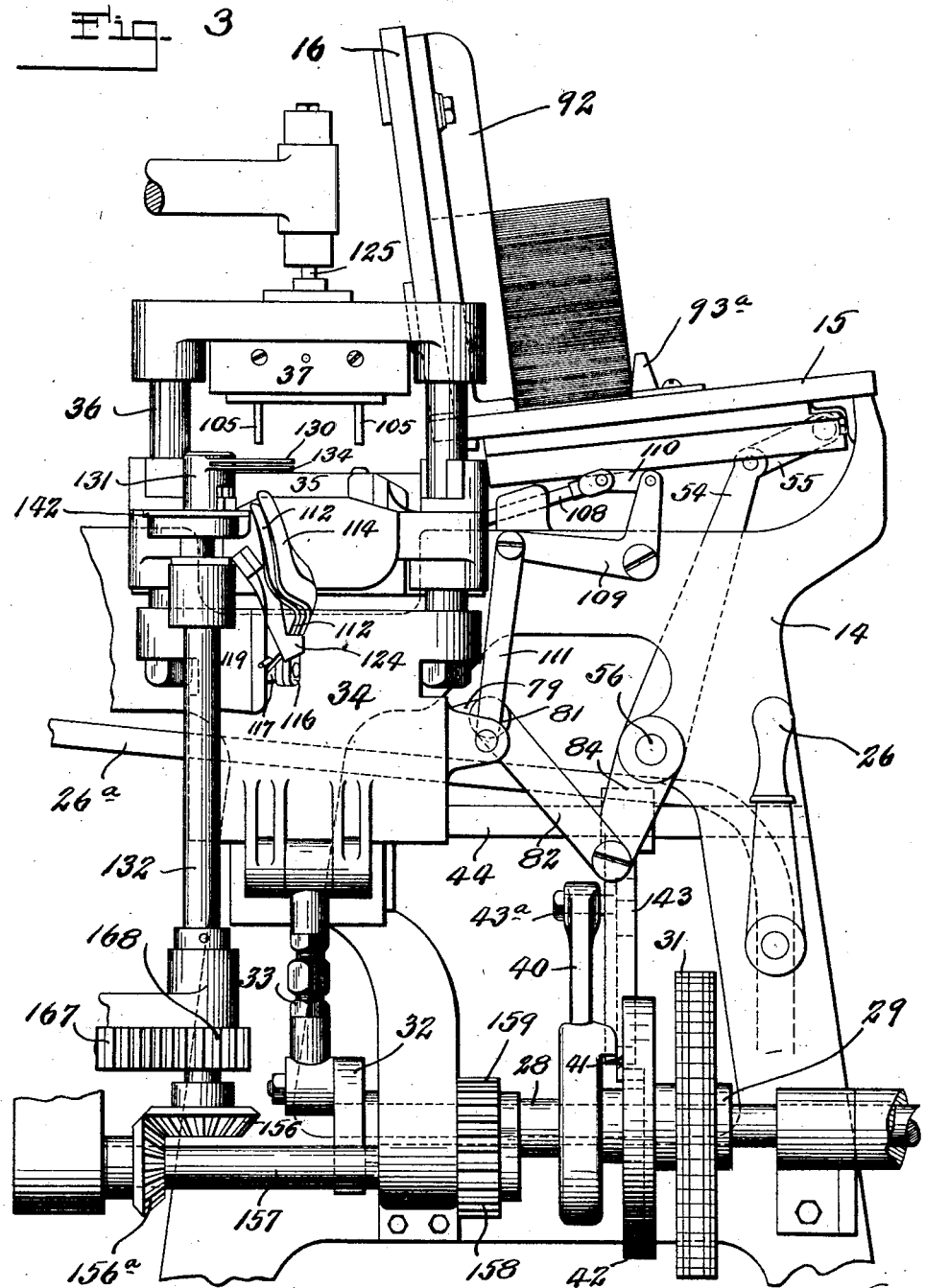

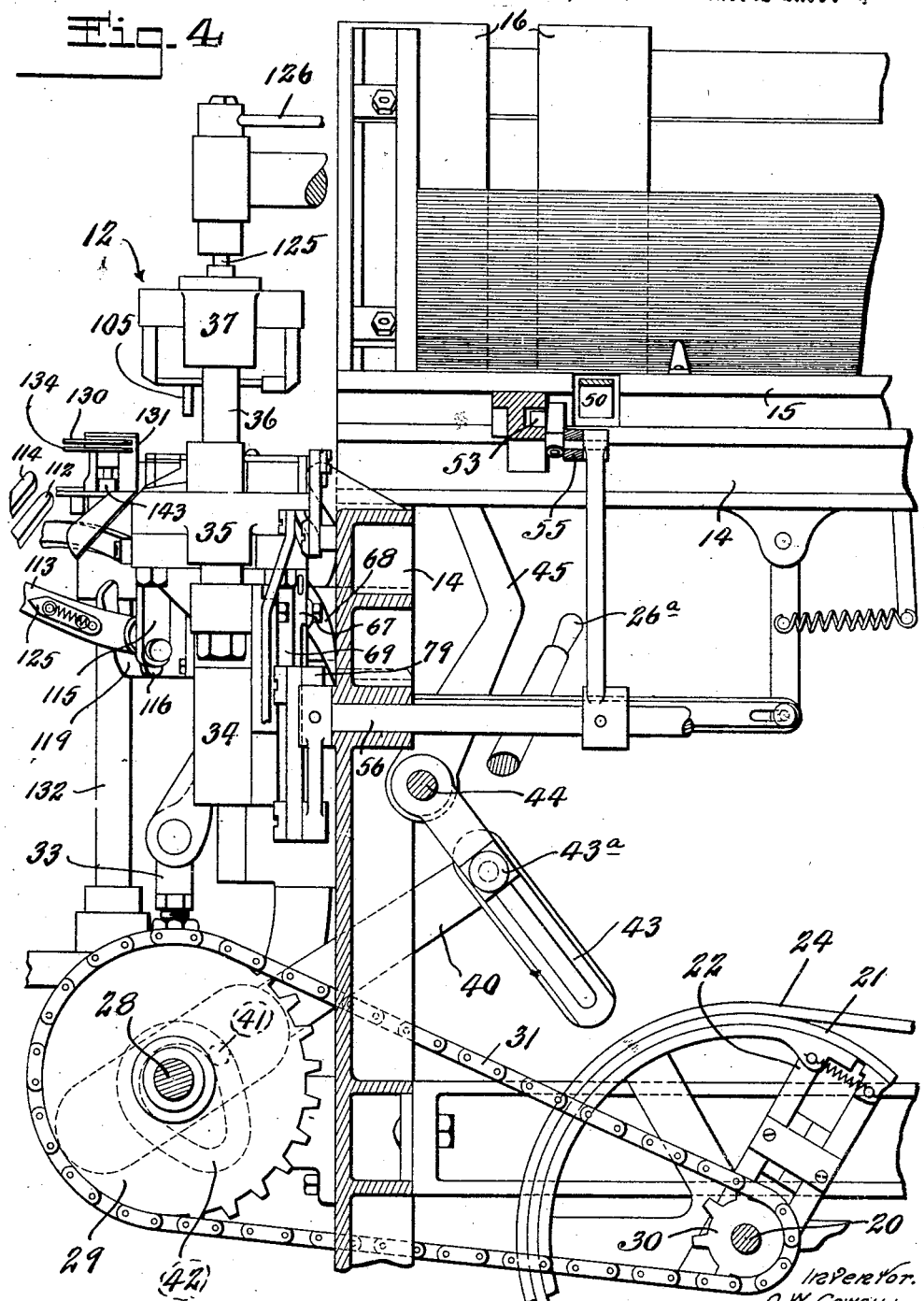

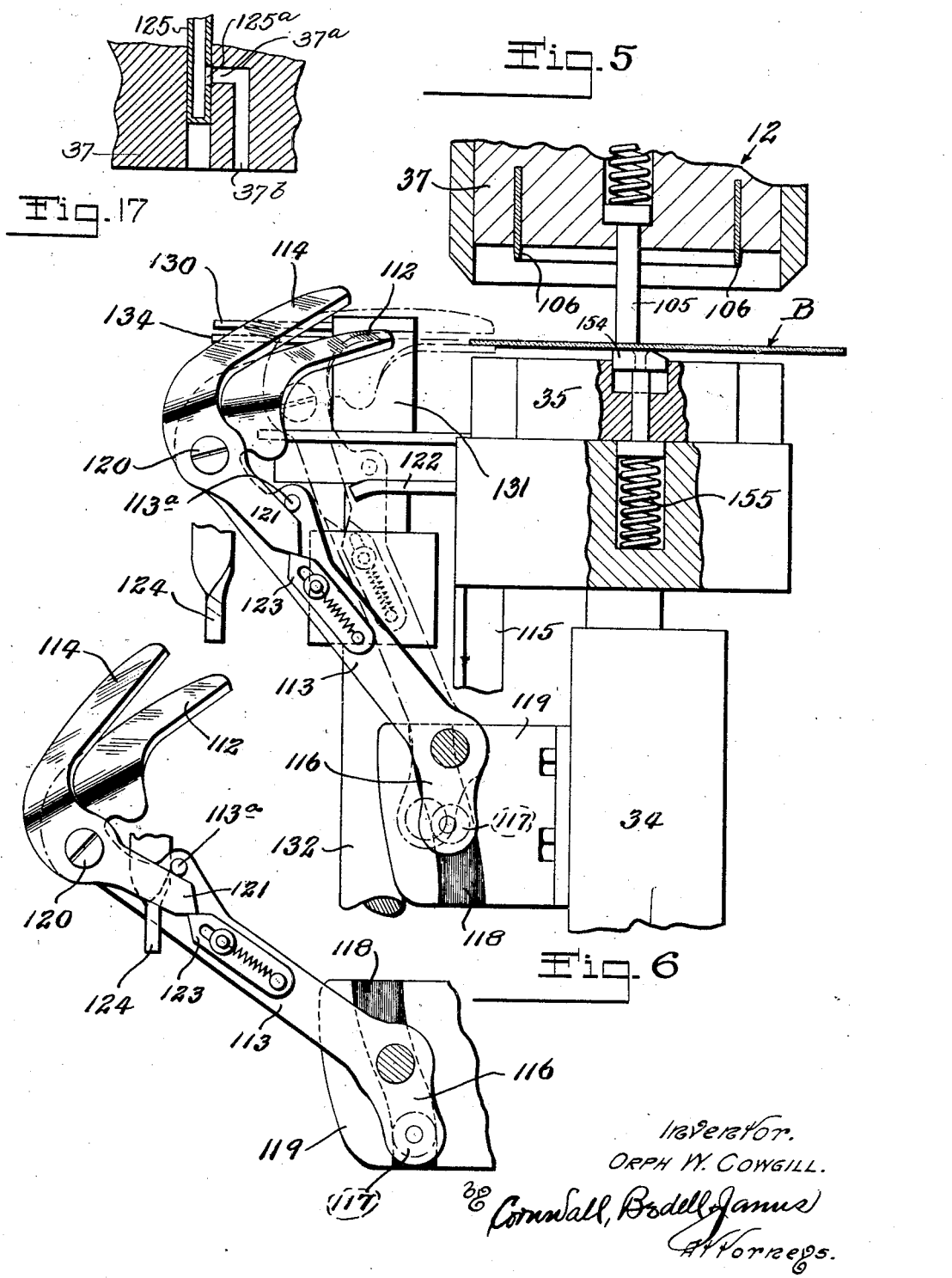

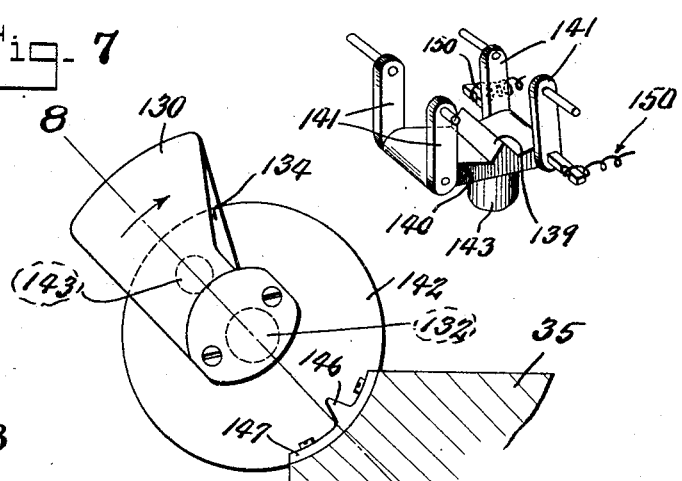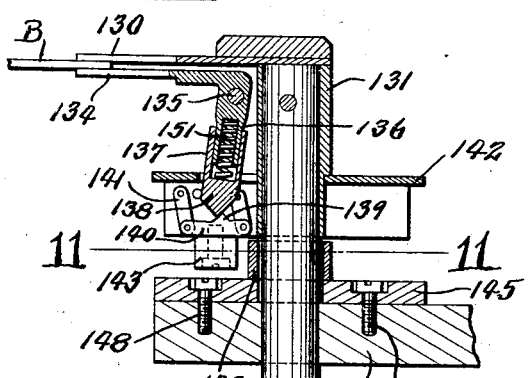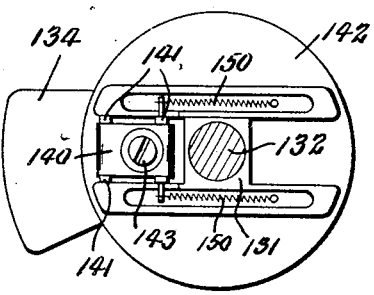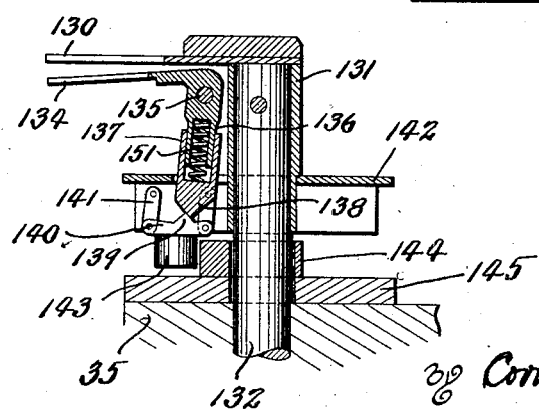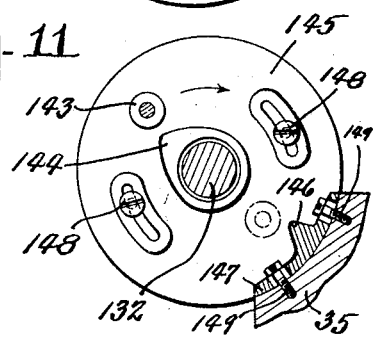

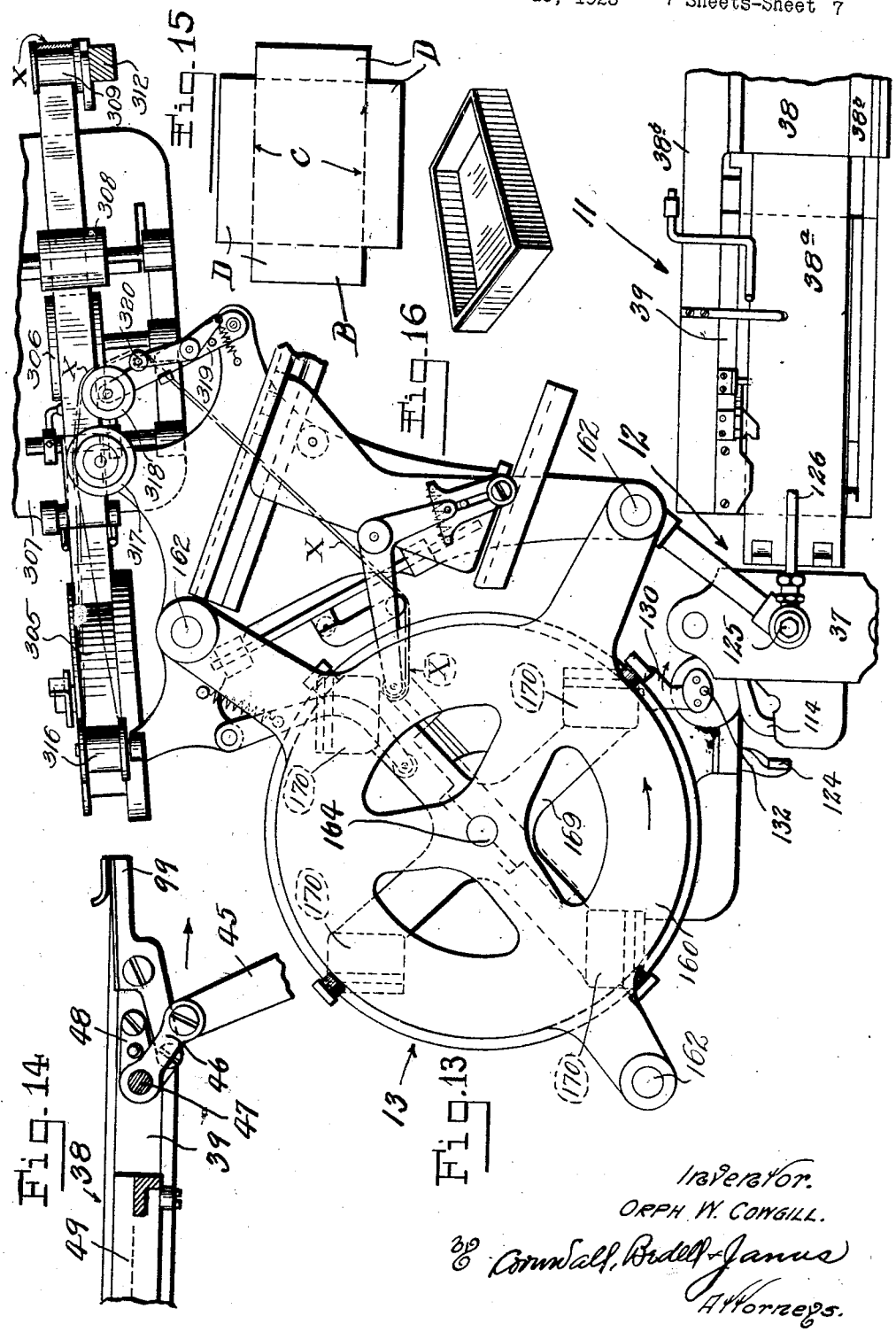

1,681,928

UNITED STATES PATENT OFFICE.

ORPH W. COWGILL, OF ST. LOUIS, MISSOURI, ASSIGNOR TO ST. LOUIS LABEL WORKS, OF ST. LOUIS, MISSOURI, A CORPORATION OF MISSOURI.

BLANKING AND TRANSFERRING MECHANISM FOR BOX-MAKING MACHINES.

Original application filed January 19, 1923, Serial No. 613,632. Divided and this application filed August 10, 1925. Serial No. 49,418.

This invention relates to new and useful improvements in box making machines, and is a divisional application of an application on box making machines filed by me January 19, 1923, Serial Number 613,632, which has matured into Patent No. 1,551,189, August 25, 1925.

The objects of the present invention are to provide a blank cutting and scoring mechanism which is accurate and positive in operation, can be operated in correlation with other mechanism with which it is associated and is self-cleaning to prevent accumulation of waste material therein.

Further objects of the invention are to combine a blank-cutting and scoring mechanism with a blank folding mechanism whereby the blank is automatically transferred to the folding mechanism, and to provide means for automatically feeding said blank from the cutting and scoring mechanism to said folding mechanism, thus greatly increasing the output of the machines of the class described.

With these and other objects in view, my invention consists in certain novel features of construction and arrangement of parts hereinafter more fully described and claimed, and illustrated in the accompanying drawings, in which—

Figure 1 is a front elevation of the machine.

Figure 2 is a plan view of the forward portion of the machine.

Figure 3 is an end view, partly broken away, of the forward end of the machine.

Figure 4 is a fragmental cross-section taken longitudinally through the forward end of the machine.

Figure 5 is a detail view of the die or blanking mechanism and parts associated therewith.

Figure 6 is a detail view showing the waste removing means moved into an open or discharging position.

Figure 7 is a plan view of the blank transferring means.

Figure 8 is a vertical cross section taken on line 8—8 of Figure 7, and showing the transferring means in a blank engaging position.

Figure 9 is a similar view showing said transferring means actuated to release a blank.

Figure 10 is a view looking against the underside of said blank transferring means.

Figure 11 is a horizontal cross section taken on line 11—11 of Figure 8.

Figure 12 is a perspective detail view of the mechanism utilized to operate said blank transferring means.

Figure 13 is a top plan view of the material supporting means, the die mechanism, and blank forming section.

Figure 14 is a detail view showing operative connections for the material feeding mechanism.

Figure 15 is a plan view of the blank.

Figure 16 is a perspective view of the box.

Figure 17 is a detail sectional view taken vertically through the movable die member and showing the valve means for controlling the discharge of compressed air.

The invention contemplates a machine in which the strip of material is fed to a die which cuts out and scores a blank, which blank is then transferred to a folding mechanism wherein the blank is folded into the proper shape and a finishing or binding band is applied to the side walls of the box. Generally speaking, the machine consists of four sections, viz, the material supporting and feeding section 10, the strip positioning section 11, the blank cutting section 12, and the blank folding and band applying section 13.

The material supporting and feeding section 10 comprises frames 14, which support a table 15, the latter sloping rearwardly toward the strip positioning section 11. Projecting upwardly from this table is a wall 16 preferably formed of upwardly extending slats which are spaced from each other and are supported on a suitable framework secured to frames 14.

The machine is actuated by an electric motor (not shown) through the medium of a belt 17 which passes over a pulley 18 fixed to shaft 19. This shaft is journaled in suitable bearings carried by the lower portion of frame 14. A shaft 20 is journaled in the forward end of frame 14 and carries a pulley 21 in which is arranged a clutch 22, whereby pulley 21 may be engaged or disengaged from shaft 20. A pulley 25 is fixed to shaft 19 and passing over this pulley and driving pulley 21 is a belt 24. Clutch 22 is controlled by a handle 26 arranged in the front end of the machine and a handle 26ª projecting rearwardly toward the blank feeding mechanism 11, thus enabling the operator to control the machine from either side. Suitable operating connections 27 connect said handles with clutch 22.

The shaft 28 is transversely journaled in bearings projecting outwardly from the forward end frame 14 and has fixed thereon a large sprocket wheel 29. Shaft 20 has fixed thereon a small sprocket wheel 30, and operating over these wheels and driving shaft 28 is a sprocket chain 31.

The rear or inner end of shaft 28 terminates below the blanking mechanism 12 and has fixed thereon a crank arm 32 to which is pivotally connected the lower end of an adjustable connecting rod 33, the upper end of which is pivotally mounted in the lower end of a casting 34. A stationary die member 35 is supported on the forward end of frame 14 above the casting 34 and projecting upwardly from this casting and passing through said stationary member 35 are posts 36, the upper ends of which carry a movable die member 37, which is designed to cooperate with the stationary member 35 and is operated from shaft 28 through the connections just described.

The strip positioning section 11 consists of a shelf 38 which extends outwardly and rearwardly from table 15, and on the same horizontal plane with the stationary member 35. This shelf 38 consists of a horizontally disposed portion 38$^a$ and supports or rails 38$^b$. Movably mounted in the forward end of this shelf is a reciprocating carriage 39. This carriage is operated from shaft 28 through the medium of an arm 40 loosely mounted on said shaft and having a roller 41 operating in the came race of a cam 42, which is fixed to shaft 28. The upper end of arm 40 is adjustably secured to the slotted end of arm 43 by suitable fastening means 43$^a$ and imparts a rocking motion to a shaft 44. This shaft is journaled in suitable bearings projecting inwardly from the forward end frame 14, and has fixed thereon an upwardly extending arm 45, the upper end of which is pivotally connected to the free end of a link 46, which latter is carried by a rod 47. (See Fig. 14.) This rod is transversely arranged in the forward end of carriage 39 and has its ends fixed in arms 48, which latter are pivotally mounted on the inner sides of carriage frame 49. Frame 49 has laterally projecting rollers which operate in suitable raceways formed in the inner sides of shelf 38 and downwardly presented rollers which hold the carriage in proper alignment. Shelf 38 is designed to receive the strip of material and carriage 39 is arranged to feed it intermittently toward the blank cutting mechanism 12.

Where the material is supplied in the form of a series of strips, the strips are stacked on table 15 in parallel with shelf 38, and suitable means is provided for moving the lowermost strip laterally from the stack onto the shelf. The means for positioning the strips on the shelf consists of a series of bars 50 operating in slots 51 formed transversely in table 15. (See Figures 2 and 4.) Each of these bars has a shoulder 50$^a$ formed thereon which extends upwardly beyond the upper surface of table 15 a substantial distance to engage during the rearward movement of said bars the forward edge of the lowermost strip and push it from under the stack of remaining strips onto the shelf 38. The lower end of slats 16 terminate above table 15 a proper distance to provide clearance for the passage of single strips. Bars 50 are supported by rollers 53 which operate in tracks formed in the sides of transverse members of frame 14. These bars are operated by means of arms 54 with which they are connected by links 55 and said arms are fixed to a shaft 56 longitudinally mounted in frame 14 below table 15. This shaft is designed to be actuated when the strip located on shelf 38 reaches a predetermined position thereon in its forward movement toward the blanking mechanism 12. The strip positioning bars 50 and shaft 56 are set in operation by a finger 57 which is actuated by suitable mechanism fully described and illustrated in my Patent No. 1,551,189, issued August 25, 1925.

The strip is fed forward to the blanking mechanism 12 during the forward movement of the carriage 39 and during the retrograde or rearward movement of the carriage the strip is held stationary by a spring pressed presser foot 98 pivotally mounted above the forward end of the extension 95 and arranged so as to allow the forward movement of the strip and hold said strip stationary against the fixed extension 95 while the carriage is being restored to its normal position.

In order to accurately hold the strip while it is being fed forwardly and particularly the short last portion thereof, the extreme forward end of the carriage is provided with strip gripping elements 99 pivotally mounted on the forward ends of the side frames of the carriage.

The blanking and scoring mechanism 12 (see Figures 3 to 6) consists of a stationary die member 35 which is secured to and projects forwardly from the forward end of frame 14 and a movable die or punch member 37 located above and adapted to be moved into cooperative relation with member 35 when casting 34 is actuated, said movable die member being connected to said casting by posts 36.

Yieldingly mounted in movable die member 37 and projecting downwardly from its face are pins 105 which are designed to engage the blank while die member 37 is being moved upwardly. Thus the blank is held immovable and retains its proper position until engaged by the transferring mechanism hereinafter more fully described.

The scoring is done by scoring knives 106, which score the blank B (Figure 15) along the dotted lines C so that the marginal portions D may be folded to form the side and end walls of the box (Figure 16). After the blank is cut, part of the waste material or scrap falls into a trough 107 located rearwardly of and below the stationary die member 35 and the scrap is then discharged therefrom by a plunger 108 which traverses said trough and is actuated by a bell crank 109 to which said plunger is connected by a short link 110. The bell crank is pivotally mounted on frame 14 and receives its motion from casting 34 to which it is connected by a long link 111.

The blank is preferably cut on all sides at each operation in order to provide an accurate blank, thereby insuring the production of boxes which are identical in size and shape. The forward and side portions of the waste material are removed from the die by cooperating fingers 112 and 114. Finger 112 is formed on the upper end of a rock arm 113 which is pivotally mounted on a bracket 115 depending from stationary die member 35. This arm has a short downward extension 116 carrying roller 117 which operates in a track 118 formed in a member 119 projecting forwardly from casting 34. Finger 114 is pivotally mounted at 120 on arm 113, and has a depending portion 121 which, when arm 113 is moved toward the die, is engaged by a pin 122 projecting from the stationary member 35, thereby causing said finger to be moved toward finger 112 and engage the scrap material.

When rock arm 113 is moved in an opposite direction, or away from the die, the depending portion 121 just before the completion of the movement of said rock arm, is engaged by a stationary arm 124 carried by the frame of the machine, and movable finger 114 is thereby disengaged from finger 112, so that the scrap material is released and discharged onto the floor or into a suitable receptacle. The extreme end of the depending portion 121 is V-shaped and is yieldingly engaged by the V-shaped end of a spring pressed member 123 which imparts snap action to the movable finger 114.

Extending into the movable die member 37 is a discharge pipe 125 having suitable discharge opening 125ª formed therein which are adapted to be brought into register with a valve opening 37ª, the latter being formed in said movable die member and terminating in a discharge opening 37ᵇ presented against the stationary die member 35 as shown in Figure 17. The valve opening 37ª is so disposed that compressed air may be discharged through said movable member onto the stationary member after each blanking and scoring operation to remove small particles of material therefrom, and thus keep the die members free and in proper working condition. The compressed air is supplied to the discharge pipe 125 from a suitable air reservoir by means of a pipe 126.

The transferring mechanism is designed to take the blank from the stationary die member after it has been cut and scored and deposit it automatically in proper position in the folding mechanism 13 (Figs. 7 to 12). This transferring mechanism consists of two horizontally disposed blades. One of said blades 130 has a sleeve 131 by means of which it is fixed to the upper end of a rotating shaft 132 journaled in suitable bearings forwardly and rearwardly of the blanking mechanism and the other blade 134 is pivotally mounted by a pin 135 on sleeve 131 below blade 130 and is movable relatively thereto into blank engaging and disengaging positions. Blade 134 has a depending tubular portion 136 which has a telescopic engagement with a tubular portion 137, the lower end of which terminates in a downwardly presented V-shaped portion 138. An upwardly V-shaped portion 139 is formed on member 140 and is adapted to have cooperative engagement with V-shaped portion 138. Member 140 is suspended by links 141 from the opposite sides of a pair of parallel ribs formed on the underside of a disk 142, which latter is fixed to the lower end of sleeve 131.

Depending from member 140 is a roller 143 which is adapted to be engaged by a cam 144 carried by disk 145 and a cam projection 146 formed on and projecting upwardly from an arcuate plate 147. Disk 145 is adjustably secured by screws 148 to a stationary portion of die member 35 and by loosening said screws said disk can be adjusted about the axis of shaft 132 to position cam 144 so that roller 143 is actuated thereby at the desired moment and blade 134 is moved into a blank disengaging position.

Plate 147 is also adjustable about the axis of shaft 132 so as to bring cam 146 into engagement with roller 143 at the desired moment whereby blade 134 is moved toward blade 130 and engages the blank. Springs 150 are connected to member 140 and tend to move the latter inwardly and a spring 151 is interposed between tubular telescopic portions 136 and 137 and holds portion 138 in yielding engagement with portion 139.

As the shaft 132 rotates, roller 143 rides upon cam 144 and is thereby forced outwardly, causing member 140 to swing outwardly on its link supports so that portion 139 in passing over the outwardly presented portion 138 forces tubular portion 137 upwardly compressing spring 151. As soon as V-shaped portions 138 and 139 pass each other, tubular portion 137 moves downwardly and causes blade 134 to rock on pivot 135 and move downwardly to occupy the blank releasing position, as shown in Figure 9.

When blades 130 and 134 reach in their travel about the axis of shaft 132, the proper position with respect to the blank held on the stationary die member 35, the outwardly moved roller 143 is engaged by cam portion 146 and is forced thereby inwardly so that blade 134 is actuated and is caused to move quickly toward blade 130 to engage the blank, the interengaging V-shaped portions 138 and 139 imparting snap action to blade 134 and maintaining said blade under tension so that the blank is securely gripped between said blades while being transferred from the die to the folding mechanism.

In order to enable blade 134 to be positioned under the blank, while the same is resting on die member 35, a series of yielding members 154 are arranged in said die and project upwardly from the face thereof through suitable openings formed therein, and hold the blank elevated a slight distance above the face of die member 35. Members 154 are yieldingly held in their raised positions by springs 155 which are located in suitable recesses formed in the body portion of die member 35 and have their ends bearing against the lower ends of members 154. Said members 154 cooperate with pins 105 yieldingly mounted in movable member 37 and the pressure exerted by springs on pins 105 is less than the pressure of springs 155 so that members 154 are not forced downwardly by pins 105. Pins 105 exert gripping pressure against members 154 until the nippers 130 and 134 have closed on the blank, thereby preventing accidental displacement of the latter and preserving accurate relation of the blank with the transferring and forming mechanisms, until the punch or movable die member 37 has been moved upwardly a desired distance.

Shaft 132 extends downwardly below casting 34 and has mounted on its lower end a bevel gear 156 which meshes with a bevel gear 156ᵃ carried by a horizontally disposed shaft 157. This shaft is mounted in suitable bearings on the forward end frame 14 and is provided with a gear 158 which is in driving engagement with a gear 159 fixed to shaft 28. Thus, blank gripping blades 130 and 134 are operated simultaneously and in proper time relation with the strip positioning means and the blanking mechanism. The blank folding and band applying section 13 is supported by horizontally disposed frame members 160 and 161 which are carried by vertically disposed posts 162, a vertically disposed shaft 164 has its ends journaled in said frame members and is operated by suitable gear 167 which is driven by a pinion 168 fixed to shaft 132 above bevel gear 156. A spider frame 169 is fixed to shaft 164 and is provided with radially projecting arms carrying blank operating portions 170. When the blank is formed a band 10 is applied thereto. This band is supplied in the form of a roll such as indicated at 305 which is located in a suitable position on the frame of the machine. The band is passed from said roll on a glue roller 306 which is journaled on a glue pot 307 and has its lower portion immersed in the glue contained therein so that the outer periphery of said roller is coated with glue.

In passing over this roller the reverse side of the band engages the periphery thereof and receives a coating of glue. The band is then passed under a roller 308 with the glue side presented outwardly and is then passed over a roller 309 carried by a vertically disposed standard 312. The band then passes over a roller (not shown) arranged above roller 309 and is then passed over a roller 316 which latter is arranged above the band roller 305. From roller 316 the band is passed over a vertically disposed roller 317 and the band in passing over this roller makes a one-quarter twist so that instead of being disposed horizontally as heretofore is arranged in vertical plane and passes over a vertically disposed roller 318 which is mounted on the free end of an arm 319. The band then passes over a small roller 320 and is then carried towards the blanking section 13 and has its end engaged by the band applying mechanism not shown in the present application but fully described and illustrated in my aforementioned patent.

In the operation of the machine, the material from which the boxes are made is supplied to shelf 38 either in the shape of strips, which are stacked on the table 15 and singly positioned on said shelf, or in the form of a roll suitably supported and fed onto said shelf. This material is then intermittently fed forward to the blanking and scoring mechanism 12 by the reciprocating carriage 39. After the blank is cut and scored, some of the waste material falls into the trough 107 and is removed therefrom by plunger 108 while other waste material is automatically removed by fingers 112 and 114.

The stroke of the movable die member can be varied by adjusting the connecting rod 33 in order to regulate the depth of the score lines. The blank at the proper time is engaged by revolving blades 130 and 134 and carried by them toward the blank folding mechanism 13 and deposited in a horizontal position on one of the forming sections. The operation of the forming section is so timed relative to the blanking operation as to place one of the forming sections in position to receive the blank from said transferring blades at the proper time.

In folding the blank, the same is held stationary relative to the forming section, and the forming section on which the blank is arranged and the blank are moved continuously in a circle concentric with shaft 164 until the blank is formed into a box and discharged from the machine. Thus, it will be seen that there is no time lost in operating upon the blank and the machine can be steadily operated without stopping to receive each blank, as the blank transferring mechanism is automatically operated in cooperation with the blank folding mechanism.

I claim:

1. In a box making machine, the combination of a die for simultaneously cutting and scoring complete blanks from a strip of material, said die including a stationary and a movable member, means for automatically removing the blank from said die, a compressed air supply pipe extending into said die member, and a valve opening in said movable die member and adapted to communicate with said pipe, said valve opening being adapted to be brought into register with said pipe in a predetermined relation with the movement of said movable die member for discharging compressed air onto said die.

2. In a box making machine, a stationary die member adapted to receive a strip of material, a movable die member cooperating with said stationary member for cutting and scoring a blank from said strip, yielding means cooperating with said movable die member for holding said blank immovable preparatory to the removal thereof, and means for discharging compressed air onto said stationary die member after each blanking operation.

3. A blank cutting mechanism for box making machines comprising a stationary die member, a punch member mounted above and cooperating therewith, and means yieldingly mounted in said stationary die member for yieldingly supporting the material at a plurality of points above the face of and in spaced relation with said stationary die member.

4. In a blank cutting mechanism for box making machines, the combination with a stationary die member, a punch member movable relative thereto, means for yieldingly supporting the blank material in spaced relation with said die member, means cooperating with said punch member for engaging and maintaining said blank material in position on said stationary die member.

5. In a blank cutting mechanism for box making machines, the combination of a stationary die, a punch member movable relative thereto, and means cooperating with said punch member for discharging air under pressure against said die members to keep the latter free from scraps.

6. In a blank cutting and scoring mechanism for box making machines, the combination of a stationary die member, a punch member movable relative thereto, means for discharging air under pressure against said die members, and a valve cooperating with said movable punch member for controlling said air discharging means.

7. A blank cutting and scoring mechanism for box making machines, comprising in combination a stationary die member, a movable die member cooperating therewith, and a pair of cooperating grippers mounted for oscillatory movement and operable by the movement of said movable die member for removing the scrap material from said die members.

8. In a blank cutting and scoring mechanism for box making machines, the combination with a stationary die member, adapted to receive the blank material, and a punch member cooperating therewith, of a pair of fingers, one of which is movable relative to the other, means for positioning said fingers with respect to said stationary die member, and means for actuating said movable finger to engage the scrap material and remove it from said stationary die.

9. In a blank cutting and scoring mechanism for box making machines, the combination with the stationary die member adapted to receive the blank material, and a punch member cooperating therewith, of a pair of fingers one of which is movable relative to the other, means for positioning said fingers with respect to said stationary die member, means for actuating said movable finger to engage the scrap material and remove it from said stationary die, and means for imparting snap action to said movable finger.

10. In a blanking mechanism, the combination with a movable blanking member, of a pair of material gripping elements, one of which is mounted for oscillatory movement and is provided with a projection operable by said movable member, and the other element is pivotally carried by said first element and is movable relative to said first element into material engaging and discharging positions, said gripper elements being capable when in engaging position to grip a portion of the waste material and discharge said material when in moved position.

11. In a blanking mechanism, the combination with a movable blanking member, of a pair of material gripping elements for removing waste material from said mechanism, said gripping elements comprising one element pivotally mounted for oscillatory movement and provided at one end with a projection operable by said movable member, the other element being pivotally mounted on the opposite end of said first element and movable into engagement therewith to engage waste material and remove it from said blanketing member.

12. In a blanking mechanism, the combination with a movable blanking member, of a pair of waste material gripping elements, one of said elements having a fixed fulcrum and being mounted for oscillatory movement and the other element being pivotally mounted on the first element and operable into engaging and disengaging relation with said first element, means for positioning said gripping elements in correlation with said movable blanking member, and stationary means engageable by said second element for opening and closing said gripping elements.

13. In a blanking mechanism, the combination with a movable blanking member, of a pair of waste material gripping elements, one of said elements being stationarily mounted for oscillatory movement and the other element being fulcrumed on the first element, snap action mechanism on said first element and engaging said second element for imparting thereto quick movement, means for positioning said first element in correlation with said movable blanking member, a pair of spaced stationary members engageable by said second element for positioning the latter into opening and closing relation with said first element, and actuating connections for operating said means in time relation with said movable member.

14. In a blanking mechanism, the combination with the driving mechanism thereof, of a pair of blades disposed in a horizontal plane in superposed spaced relation with each other and operable in a horizontal plane to engage a blank and remove it from said blanking mechanism, said blades being conjointly operable and rotatable about a vertical axis by said driving mechanism.

15. The combination with a blanking mechanism, of a pair of cooperating blades disposed in a horizontal plane in superposed spaced relation with each other and adapted to engage a blank and remove it from said blanking mechanism, one of said blades being fixed and the other blade being pivotally mounted and operable relative to said first blade, tripping mechanism for positioning said pivotal blade, said tripping mechanism including a depending roller, means engageable by said roller for actuating said tripping mechanism, driving connections for said blanking mechanism, and means operable by said driving connections for actuating said blades and said tripping mechanism around a vertical axis in time relation with said blanking mechanism.

In testimony whereof I hereunto affix my signature this 6th day of August, 1925.

ORPH W. COWGILL.